United States Patent
Krishnamurthy

(10) Patent No.: US 8,141,150 B1
(45) Date of Patent: Mar. 20, 2012

(54) METHOD AND APPARATUS FOR AUTOMATIC IDENTIFICATION OF PHISHING SITES FROM LOW-LEVEL NETWORK TRAFFIC

(75) Inventor: Balachander Krishnamurthy, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1141 days.

(21) Appl. No.: 11/581,871

(22) Filed: Oct. 17, 2006

Related U.S. Application Data

(60) Provisional application No. 60/774,341, filed on Feb. 17, 2006.

(51) Int. Cl.
G06F 11/00 (2006.01)
G06F 12/14 (2006.01)
G06F 12/16 (2006.01)
G08B 23/00 (2006.01)

(52) U.S. Cl. ............... 726/22; 726/23; 726/24

(58) Field of Classification Search ............ 726/22–25
See application file for complete search history.

(56) References Cited

U.S. PATENT DOCUMENTS

| | | | |
|---|---|---|---|
| 2006/0123464 A1* | 6/2006 | Goodman et al. | 726/2 |
| 2006/0123478 A1 | 6/2006 | Rehfuss et al. | |
| 2007/0005984 A1* | 1/2007 | Florencio et al. | 713/178 |
| 2007/0033639 A1* | 2/2007 | Goodman et al. | 726/2 |
| 2007/0118528 A1* | 5/2007 | Choi et al. | 707/9 |
| 2007/0192855 A1* | 8/2007 | Hulten et al. | 726/22 |
| 2008/0046970 A1* | 2/2008 | Oliver et al. | 726/3 |

OTHER PUBLICATIONS

Juan Chen; Chuanxiong Guo; Communications and Networking in China, 2006. ChinaCom '06. First International Conference on Oct. 25-27, 2006 pp. 1-7.*

* cited by examiner

*Primary Examiner* — Eleni Shiferaw
*Assistant Examiner* — Jing Sims

(57) ABSTRACT

A module is configured to identify a phishing Web site. The module identifies email associated with a Web site and transmitted to a plurality of recipients. The module then determines that the Web site has received less than a first threshold amount of traffic before a first time. The module then determines that the Web site has received more than a second threshold amount of traffic between the first time and a second time (i.e., a spike in traffic between the first time and the second time). The module then determines that at least a portion of the more than a second threshold amount of traffic is received as a result of the email associated with the Web site being sent to the plurality of recipients.

27 Claims, 3 Drawing Sheets

METHOD AND APPARATUS FOR AUTOMATIC IDENTIFICATION OF PHISHING SITES FROM LOW-LEVEL NETWORK TRAFFIC

This application claims the benefit of U.S. Provisional Application No. 60/774,341 filed Feb. 17, 2006, which is incorporated herein by reference.

BACKGROUND OF THE INVENTION

The present invention relates generally to network security and more specifically to identifying phishing Web sites.

Phishing attacks primarily consist of sending emails that are forged to appear as if originating from commercial organizations. The sending of the email is an attempt to cause one or more recipients of the email to access a phony Web site that has been set up to gather information about the recipient(s).

Phishing is typically different from spamming. Phishers send out fake emails to a large number of recipients after setting up one or more Web sites that look similar to the Web sites of banking and other financial institutions. A typical goal of phishing is to mislead people into thinking that the email they received is from a legitimate business organization. The email directs the email recipients to Web sites under the phisher's control. The Web sites have often been set up to gather personal, sensitive information such as credit card numbers, user identification numbers, and passwords. After some (e.g., a short) amount of time, the sites are taken down to prevent discovery. Thus, the window of opportunity to detect phishing sites is often the time between the first email being sent and the time that the Web site is taken down.

Typically, phishing sites are discovered after a person (or group of people) report the phishing attack to a Web site that collects such information. The potential phishing site is then manually checked to determine whether the site is a phishing Web site. Tools to accomplish this traditionally exist as part of a toolbar (e.g., Netcraft), are from hand-checked reports (dslreports.com), etc. The manual checking of potential phishing sites is often time and/or work intensive.

Thus, there remains a need to more effectively identify phishing sites.

BRIEF SUMMARY OF THE INVENTION

In accordance with an aspect of the present invention, a module performs several steps to identify a phishing Web site. The module identifies emails associated with a Web site and transmitted to a plurality of recipients. The association with a Web site may be, for example, a link (e.g., a Uniform Resource Locator (URL)) embedded within the text of the email. The module also determines that the Web site has received less than a first threshold amount of traffic before a first time. The amount of traffic that is less than a first threshold amount of traffic may be a very small amount of traffic or substantially no traffic. The module then determines that the Web site has received more than a second threshold amount of traffic between the first time and a second time (i.e., a spike in traffic between the first time and the second time). The module then determines that at least a portion of the more than a second threshold amount of traffic is received as a result of the email associated with the Web site being transmitted to the plurality of recipients within a third time period. When these determinations are made, the module identifies the Web site as a potential phishing Web site.

The module may then take additional actions to further determine that the Web site is a phishing Web site. For example, the module may compare the traffic to traffic patterns stored in a database. The module may also examine contents of the Web site to determine that the Web site is a phishing Web site. Once the module determines that the Web site is a phishing Web site, the module performs one or more of the following steps: 1) delaying the traffic going to the Web site, 2) blocking the traffic going to the Web site, and/or 3) displaying (e.g., once or periodically) one or more warnings to the recipient(s) that the Web site is a phishing Web site.

These and other advantages of the invention will be apparent to those of ordinary skill in the art by reference to the following detailed description and the accompanying drawings.

DETAILED DESCRIPTION

In accordance with an aspect of the present invention, email traffic from the same (or a few, different) Internet Protocol (IP) sources going to a large number of different recipients can be examined to help identify potential phishing Web sites. Note that this email traffic is followed shortly thereafter by HTTP (Web) traffic from the recipient IPs to the phishing Web site. There may also be traffic to a legitimate site before the recipient is redirected to the phishing Web site. By detecting such a sequence of traffic (email in one direction to many, followed by Web traffic from a subset of many to one), it is possible to identify phishing sites without manual intervention. The present invention is an automated way of detecting phishing Web site candidates. A human does not need to be involved in the detection process.

Figure 1:
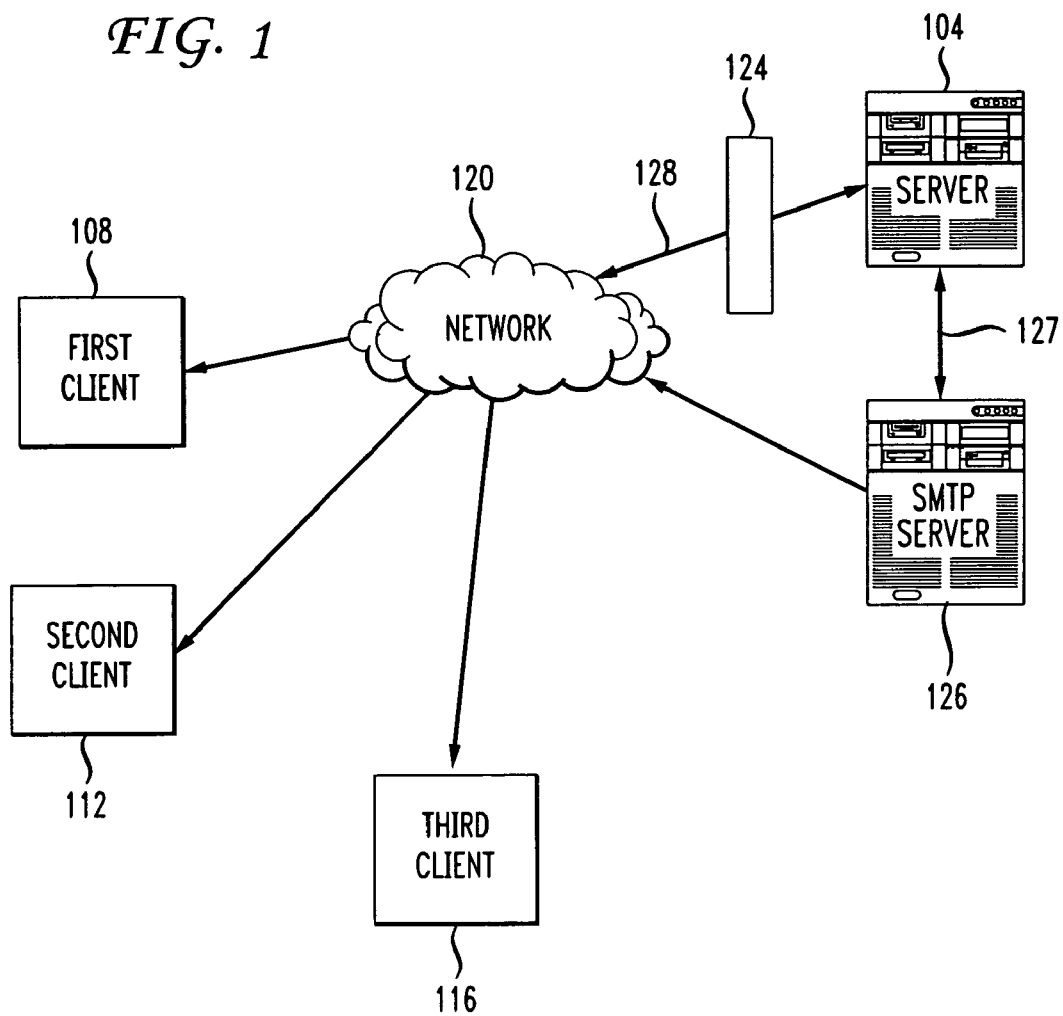
FIG. 1 is a block diagram of a module, in accordance with an embodiment of the present invention, that detects traffic going to and from a server that communicates with a plurality of clients.

FIG. 1 is a block diagram of a server 104 that communicates with a first client 108, a second client 112, and a third client 116 over a network 120 such as the Internet. Each client 108, 112, 116 can include a Web browser for viewing Web pages retrieved over the network 120. The server 104 enables one or more Web pages to be accessed by one or more of the clients 108, 112, 116.

The server is in communication with a module 124. In one embodiment, an Internet Service Provider (ISP) installs and manages the module 124. The module 124 is a software module that can detect, monitor and analyze network traffic 128 (e.g., Hypertext Transfer Protocol (HTTP) traffic, Simple Mail Transfer Protocol (SMTP) traffic, etc.) being transmitted and/or received by the server 104. In one embodiment, to analyze network traffic 128, the module 124 constructs one or more lists describing the traffic to and/or from one or more Web sites on the server 104.

The server 104 may also be in communication with an SMTP server 126 (as shown with arrow 127). The SMTP server 126 does not host the potential phishing Web site (like the server 104) but instead may send emails associated with the potential phishing Web site to a plurality of recipients. In one embodiment (and as shown in FIG. 1), the emails sent by the STMP server 126 are not received by the module 124 and are instead directly sent to the recipient(s) via the network 120. Alternatively, the email sent by the server 126 is received by the module 124 before being sent to its recipient(s). In yet another embodiment, the server 104 transmits emails to a plurality of recipients.

Figure 2:
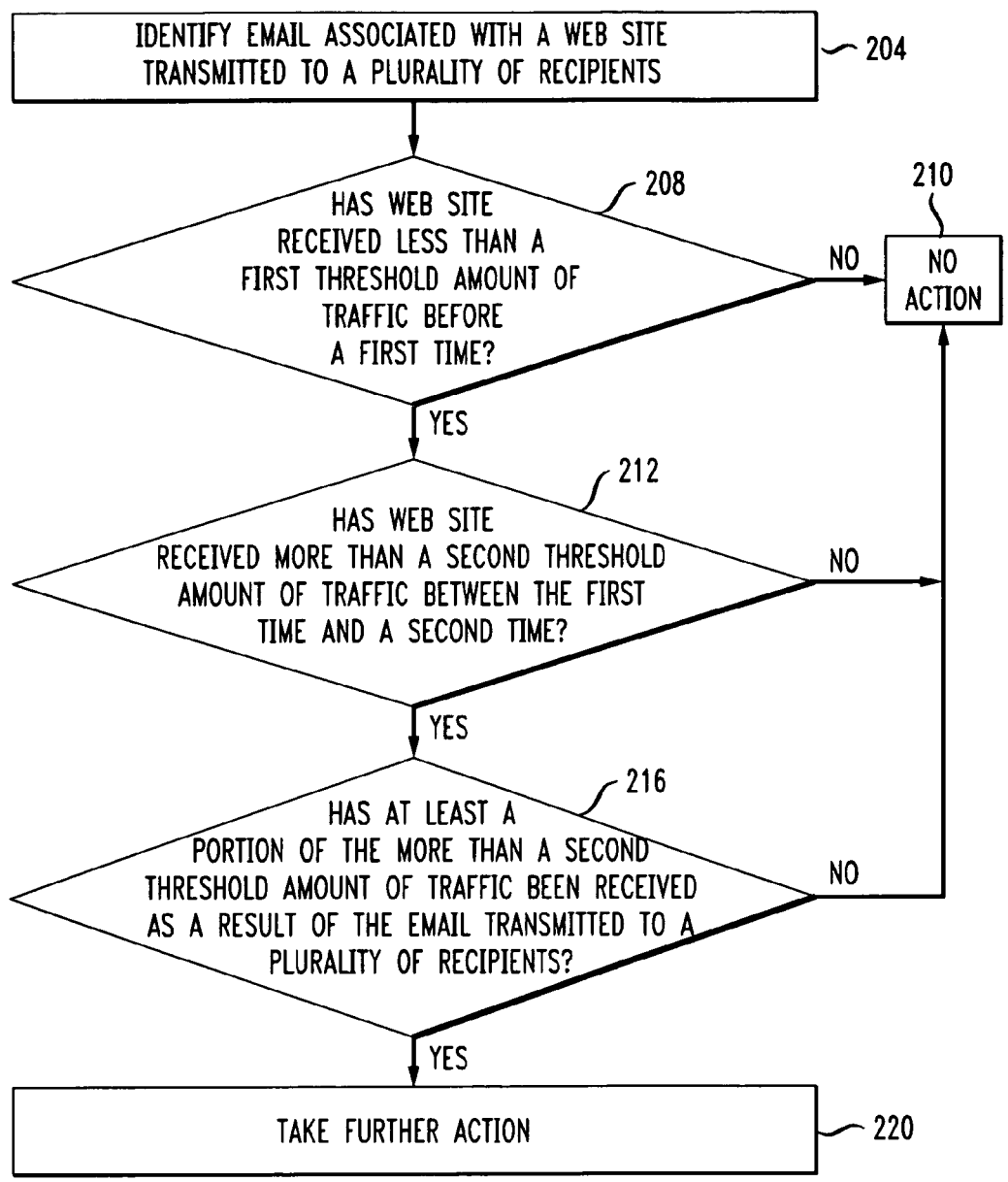
FIG. 2 is a flowchart showing the steps performed by the module in accordance with an embodiment of the present invention.

FIG. 2 shows the steps performed by the module 124 to identify a Web site as a site being used for phishing in accordance with an aspect of the invention. The module 124 identifies emails transmitted from the same (or a few) Internet Protocol (IP) sources to a plurality of recipients in step 204. The emails are associated with a Web site (i.e., an IP address). For example, each email may have a link embedded within the email to a particular Web site (or text about the Web site) directing the recipient of the email to the Web site. The module 124 then determines whether the Web site has received less than a first threshold amount of traffic before a first time in step 208. The first threshold amount of traffic is likely a very small amount or may be nothing at all. The first time may correspond to the time at which the Web site first receives traffic.

If the Web site has received more traffic than the first threshold amount of traffic before a first time, then likely the Web site was available and known before the first time. As a result, the Web site is likely not a phishing Web site and the module 124 performs no action, as shown in step 210.

If the Web site has received less than a first threshold amount of traffic before a first time, the module 124 then determines whether the Web site has received more than a second threshold amount of traffic between the first time and a second time in step 212. Thus, the module 124 determines whether the Web site receives a spike in traffic after the first time but before a second time (e.g., after the Web site has been made accessible to clients but before the Web site is subsequently made inaccessible (e.g., for a short time duration)). If the module 124 determines that the Web site has not received a spike in traffic between the first and second times, then the Web site is likely not a phishing Web site and so the module 124 performs no action (step 210).

If the Web site has received more than a second threshold amount of traffic (i.e., a spike in traffic) between the first time and the second time in step 212, then the module 124 determines, in step 216, whether at least a portion of the more than a second threshold amount of traffic has been received by the Web site as a result of the emails previously sent to the plurality of recipients. The portion of the more than a second threshold amount of traffic may be any percentage of the traffic, such as half of the traffic, 75% of the traffic, etc. Thus, the traffic received by the potential phishing Web site is received a small time period (i.e., a third time period) after emails associated with the phishing Web site are transmitted to one or more recipients. Therefore, a temporal causality exists between the traffic received by the phishing Web site and the emails sent (e.g., by the SMTP server 108 shown in FIG. 1).

If at least a portion (i.e., greater than a threshold amount) of the more than a second threshold amount of traffic has been received as a result of the email transmitted to the plurality of recipients (i.e., the traffic to the Web site is temporally related (i.e., a temporal causality) to the email transmitted to the plurality of recipients), the module 124 determines that the Web site is likely a phishing Web site and takes further action in step 220. The further action performed in step 220 may be to eliminate false positives (i.e., Web sites that appear to be (i.e., have characteristics of) a phishing Web site but are not phishing Web sites).

The further action performed in step 220 may include the module 124 delaying or blocking the traffic going to the Web site in order to further analyze the traffic. In yet another embodiment, the module 124 displays one or more warnings (e.g., a pop-up window) (e.g., once, a set number of times, or periodically) to the recipient(s) that a particular Web site may be a phishing Web site (or at least that the Web site may not be secure and is under further investigation).

In another embodiment, the module 124 further examines the content of the Web site in step 220 to determine, for example, if the Web site is financial in nature (because most, if not all, phishing Web sites have at least some financial (e.g., fiduciary) component (e.g., the Web site requests credit card information, is associated with a bank, etc.). In one embodiment, if the module 124 determines that the recent emails were not the first emails sent to the plurality of recipients, then the likelihood that the Web site is a phishing Web site decreases because a phishing Web site typically sends out one or more emails to each recipient during the time period that the Web site is available to recipients in order to notify the recipients of the Web site. In one embodiment, after the email(s) are sent, a Web site (e.g., a non-phishing Web site) typically does not send additional emails to the recipients. The module 124 may, even after determining any one or more of the above factors, perform additional analysis to further determine whether the Web site is a phishing Web site.

In yet another embodiment, the module 124 maintains a list of Web sites of legitimate financial institutions. The module 124 can compare this list with a Web site that the module 124 suspects to be a phishing Web site to determine if the site matches any of the Web sites on the list. If there is a match, then the module 124 determines that the Web site is not a phishing Web site. If no match exists, then the Web site is likely a phishing Web site.

In one embodiment, the module 124 uses data stream scan (dss) software to implement the present invention. dss is a framework for describing, transforming, reading, querying, and writing streams of record oriented data. dss can be used to aid network measurements. In one embodiment, dss is implemented as a command and library application interface (API). The API can be extended by dynamic link libraries (DLLs) (i.e., shared libraries) that define data domain specific input/output, type and query functions. A goal of dss is to provide a best-in-class repository for data scanning, along with up-to-date documentation as a side effect of coding to the API.

Phishing is one example of an application that can benefit from this invention. Other applications that depend on a narrow sequence of events that can be matched in traffic can also benefit. For example, a typosquatting domain—a common misspelling of well-known Web sites—may be able to benefit from this invention. For example, if a domain name "morganstalley.com" is registered, and, e.g., advertisements are placed on the Web site of morganstalley.com, and if this Web site receives traffic after sending out email(s) to one or more recipient(s), this Web site may be detected by the module 124.

Figure 3:
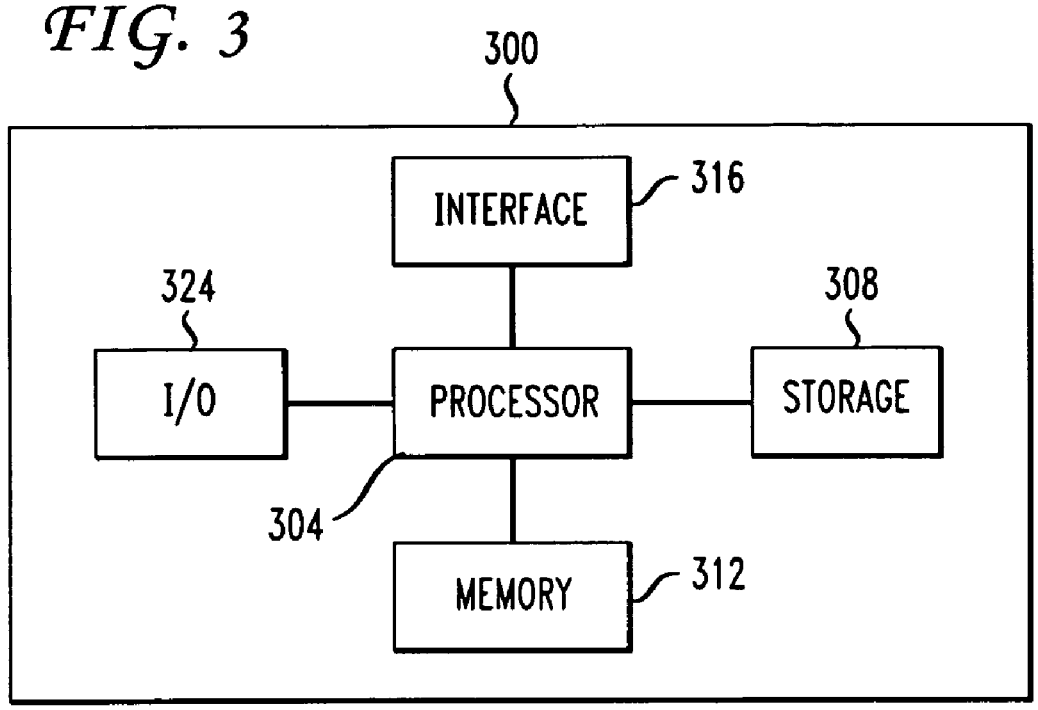
FIG. 3 shows a high level block diagram of a computer system which may be used in an embodiment of the invention.

The previous description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other nodes. A high level block diagram of such a computer is shown in FIG. 3. In one embodiment, computer 300 represents the module. Computer 300 contains a processor 304 which controls the overall operation of computer 300 by executing computer program instructions which define such operation. The computer program instructions may be stored in a storage device 308 (e.g., magnetic disk) and loaded into memory 312 when execution of the computer program instructions is desired. Computer 300 also includes one or more interfaces 316 for communicating with other devices (e.g., locally or via a network). For example, the interface(s) 316 receive and then transmit the emails transmitted by the server (e.g., server 104 or mail server) to the plurality of recipients so that the computer 300 can analyze the emails. Computer 300 also includes input/output 324 which represents devices which allow for user interaction with the computer 300 (e.g., display, keyboard, mouse, speakers, buttons, etc.).

One skilled in the art will recognize that an implementation of an actual computer will contain other nodes as well, and that FIG. 3 is a high level representation of some of the nodes of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for identifying a web site associated with one of a plurality of internet protocol sources used for phishing comprising:
   determining at a hardware processor whether the web site has received less than a first threshold amount of traffic before a first time;
   in response to determining that the web site has not received less than a first threshold amount of traffic before a first time, determining that the web site is not categorized as a phishing web site;
   in response to determining that the web site has received less than a first threshold amount of traffic before a first time, determining at the hardware processor whether the web site has received more than a second threshold amount of traffic between the first time and a second time;
   in response to determining that the web site has not received more than a second threshold amount of traffic between the first time and a second time, determining that the web site is not categorized as a phishing web site;
   in response to determining that the web site has received more than a second threshold amount of traffic between the first time and a second time, determining at the hardware processor whether a portion of the more than the second threshold amount of traffic is received by the web site during a third time period after emails are transmitted from one of the plurality of internet protocol sources associated with the web site to a plurality of recipients;
   in response to determining that the portion of the more than the second threshold amount of traffic is not received by the web site during a third time period after emails are transmitted from the one of the plurality of internet protocol sources associated with the web site to a plurality of recipients, determining the web site is not categorized as a phishing web site; and
   in response to determining that the portion of the more than the second amount of traffic is received by the web site during the third time period after emails are transmitted from the one of the plurality of internet protocol sources associated with the web site to the plurality of recipients, determining that the portion of the more than the second threshold amount of traffic is temporally related to the emails transmitted to the plurality of recipients.

2. The method of claim 1 further comprising identifying the emails associated with the web site that are transmitted to the plurality of recipients.

3. The method of claim 1 further comprising performing further action after determining at the hardware processor that the portion of the more than the second threshold amount of traffic is received as a result of the emails associated with the web site being transmitted to the plurality of recipients within the third time period.

4. The method of claim 3 further comprising blocking traffic to the web site.

5. The method of claim 3 further comprising delaying traffic to the web site.

6. The method of claim 3 further comprising displaying a warning about the web site to one recipient of the plurality of recipients.

7. The method of claim 1 wherein the first amount of traffic is substantially zero traffic.

8. The method of claim 1 wherein the first time is a time at which the web site becomes accessible.

9. The method of claim 1 wherein the second time is a time at which the web site becomes inaccessible for a duration to some of the plurality of recipients after the first time.

10. The method of claim 1 further comprising inspecting the contents of the emails.

11. A system for identifying a web site associated with one of a plurality of internet protocol sources used for phishing comprising:
    a server configured to transmit a plurality of emails to a plurality of recipients;
    a module configured to determine whether the web site has received less than a first threshold amount of traffic before a first time, and in response to determining that the web site has not received less than a first threshold amount of traffic before a first time, determining that the web site is not categorized as a phishing web site;
    in response to determining that the web site has received less than a first threshold amount of traffic before a first time, the module further configured to determine whether the web site has received more than a second threshold amount of traffic between the first time and a second time, and in response to determining that the web site has not received more than a second threshold amount of traffic between the first time and a second time, determining that the web site is not categorized as a phishing web site;
    in response to determining that the web site has received more than a second threshold amount of traffic between the first time and a second time, the module further configured to determine whether a portion of the more than the second threshold amount of traffic is received by the web site during a third time period after emails are transmitted from one of the plurality of internet protocol sources associated with the web site to a plurality of recipients, in response to determining that the portion of the more than the second threshold amount of traffic is not received by the web site during a third time period after emails are transmitted from the one of the plurality of internet protocol sources associated with the web site to a plurality of recipients, determining the web site is not categorized as a phishing web site; and in response to determining that the portion of the more than the second amount of traffic is received by the web site during the third time period after emails are transmitted from the one of the plurality of internet protocol sources associated with the web site to the plurality of recipients, determining that the portion of the more than the second threshold amount of traffic is temporally related to the emails transmitted to the plurality of recipients.

12. The system of claim 11 wherein the module is configured to identify the plurality of emails.

13. The system of claim 11 wherein the module is configured to perform further action after the determining that a portion of the more than the second threshold amount of traffic is received as a result of the emails associated with the web site being transmitted to the plurality of recipients within the third time period.

14. The system of claim 13 wherein the module is configured to block traffic to the web site.

15. The system of claim 13 wherein the module is configured to delay traffic to the web site.

16. The system of claim 13 wherein one of the server or the module is configured to transmit a warning about the web site to one recipient of the plurality of recipients.

17. The system of claim 11 wherein the first amount of traffic is substantially zero traffic.

18. The system of claim 11 wherein the first time is a time at which the web site becomes accessible.

19. The system of claim 11 wherein the second time is a time at which the web site becomes inaccessible for a duration to some of the plurality of recipients after the first time.

20. The system of claim 11 wherein the module inspects the contents of one email of the plurality of emails.

21. A module for identifying a web site associated with one of a plurality of internet protocol sources used for phishing comprising:

means for determining whether the web site has received less than a first threshold amount of traffic before a first time;

in response to determining that the web site has not received less than a first threshold amount of traffic before a first time, means for determining that the web site is not categorized as a phishing web site;

in response to determining that the web site has received less than a first threshold amount of traffic before a first time, means for determining that the web site has received more than a second threshold amount of traffic between the first time and a second time;

in response to determining that the web site has not received more than a second threshold amount of traffic between the first time and a second time, means for determining that the web site is not categorized as a phishing web site;

in response to determining that the web site has received more than a second threshold amount of traffic between the first time and a second time, means for determining that a portion of the more than the second threshold amount of traffic is received by the web site during a third time period after emails are transmitted from one of the plurality of internet protocol sources associated with the web site to a plurality of recipients; and in response to determining that the portion of the more than the second threshold amount of traffic is not received by the web site during a third time period after emails are transmitted from the one of the plurality of internet protocol sources associated with the web site to a plurality of recipients, means for determining the web site is not categorized as a phishing web site;

in response to determining that the portion of the more than the second amount of traffic is received by the web site during the third time period after emails are transmitted from the one of the plurality of internet protocol sources associated with the web site to the plurality of recipients, means for determining that the portion of the more than the second threshold amount of traffic is temporally related to the emails transmitted to the plurality of recipients.

22. The module of claim 21 further comprising means for identifying the emails associated with the web site that are transmitted to the plurality of recipients.

23. The module of claim 21 further comprising means for performing further action after the determining that the portion of the more than the second threshold amount of traffic is received as a result of the emails associated with the web site being transmitted to the plurality of recipients within a third time period.

24. The module of claim 23 further comprising means for blocking traffic to the web site.

25. The module of claim 23 further comprising means for delaying traffic to the web site.

26. The module of claim 23 further comprising means for displaying a warning about the web site to one recipient of the plurality of recipients.

27. The module of claim 21 further comprising means for inspecting the contents of the emails.

* * * * *